(Model.)
J. R. HARLOW.
TROLLING SPOON HOOK.
No. 378,678. Patented Feb. 28, 1888.
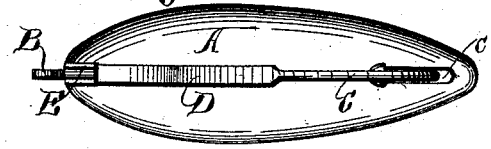
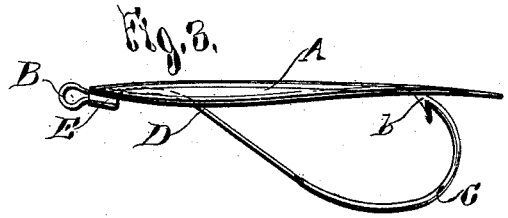
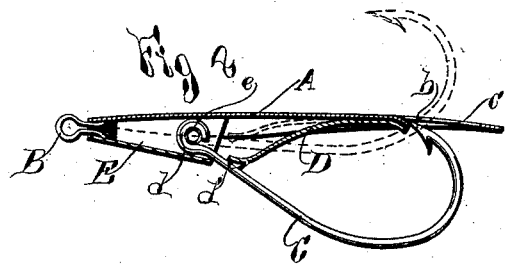
WITNESSES:
H. E. Parsons,
C. W. H. Brown.
INVENTOR
John R. Harlow
BY Hey & Gibbs
ATTORNEYS.

United States Patent Office.

JOHN R. HARLOW, OF AUBURN, NEW YORK, ASSIGNOR TO THE BRINKER-HOFF COMPANY, OF SAME PLACE.

TROLLING-SPOON HOOK.

SPECIFICATION forming part of Letters Patent No. 378,678, dated February 28, 1888.

Application filed August 25, 1887. Serial No. 247,823. (Model.)

*To all whom it may concern:*

Be it known that I, JOHN R. HARLOW, of Auburn, in the county of Cayuga, in the State of New York, have invented new and useful Improvements in Trolling-Spoon Hooks, of which the following, taken in connection with the accompanying drawings, is a full, clear, and exact description.

My invention relates to improvements in trolling-spoons for fishing in which means are provided for preventing the fish-hook from catching in grass or weeds; and the object is to provide a simple and very efficient trolling-spoon which will overcome all tendency in the hook to catch, and at the same time operate when taken by a fish without any tripping appliances.

My invention is shown in the accompanying drawings, and is fully disclosed in the following specification and claims.

In specifying my invention reference is had to the accompanying drawings, forming a part of this specification, like letters indicating corresponding parts in all the views, in which—

Figure 1 is a top plan of the front side of my improved trolling-spoon, illustrating the elongated slot at or near one end of the spoon provided with a depression in which the point or bill of the fish-hook rests normally. Fig. 2 is a like view of the rear side of the trolling-spoon, illustrating the spring-hook secured to the spoon and bearing with its point or bill on the stop in the elongated slot at or near the other end of the spoon. Fig. 3 shows a longitudinal edge view illustrating the hook in its normal position in relation to the spoon; and Fig. 4 is a longitudinal section of a modification taken through the center of the spoon, illustrating the detail construction and arrangement of the parts.

A indicates the trolling-spoon, which may be of any suitable form or shape; but I prefer the form illustrated in Fig. 1.

The spoon A is provided at or near one extremity thereof with a slot, c, which is elongated and provided near its upper end with a depression, a, Figs. 1 and 4, which is sufficiently lower than the metal of the exterior of the spoon to provide a depressed seat or stop for the point or bill of the fish-hook, for the purpose presently explained. The opposite extremity of the spoon is provided with means for connecting the same with the line. Upon the reverse side of the spoon in the lugs E, Figs. 2, 3, and 4, I secure the hook C, provided with a spring-shank, D, and a point or bill, b. It will be observed that the bill or point of the hook is inserted in the slot above the shank.

The spring D is secured to the lugs E E of the spoon A, in order that the spring D may exert its tension outwardly from the spoon A, so that the bill or point b of the hook C is drawn with a constant force into the depression a of the spoon A. It will now be apparent that the office of the depression a is to afford a depressed seat or stop for the point or bill b of the fish-hook, so as to leave the outer surface of the spoon A perfectly free from such projecting points on the surface as will catch in weeds or grass, or upon other obstructions, as the hook is drawn through the water in trolling, and also to form a stop to arrest the backward movement of the hook.

The back of the hook C projects in a curve, as best shown in the edge view, Fig. 3; hence there is nothing on the reverse side of the spoon to catch or entangle as the hook is drawn through the water.

I am aware that other trolling fish-hooks have been made and patented with the purpose in view of avoiding entanglement with weeds, logs, &c., when drawn through the water; but in all of such prior devices some sort of a tripping appliance was connected to the hook and spoon whereby it was necessary to trip the hook in order to hook the fish, and such tripping appliances were very liable to catch in the weeds and grass in fishing, and thereby defeat the very purpose for which such devices were designed. My invention differs from these preceding devices in that I do not employ a tripping device, but locate the bill of my hook so that the point will be shielded and will preferably lie in the depression or seat in the spoon, with the spring-pressure exerted to draw the hook into the said depression or against the seat with a constant force; hence the normal condition of things is such that it is absolutely impossible to entangle the spoon in grass or weeds or to catch it upon submerged logs. The construction is also such that when a fish is secured the spring-power exerted upon the hook forces the spoon and hook against the engaged portion of the fish, so that the hook cannot be thrown out or disengaged, and thus I accomplish a desirable result and produce a trolling fish-hook greatly superior to the devices which have preceded it. Furthermore, the construction is greatly simplified by dispensing with the tripping appliances, while my invention is just as positive and effective in taking a fish, since the slightest pressure of the hook toward the spoon when struck by the fish forces the hook immediately into the fish and hooks him securely.

I do not restrict myself to the specific construction of the trolling-spoon illustrated in Figs. 1, 2, and 3, since it is obvious that the construction may be radically changed without departing from the principle of my invention, which, as stated, consists, essentially, in providing the depressed seat $a$ at the end of the slot $c$ in the spoon A and seating the bill or point of the hook $b$ yieldingly therein, so as to leave the outer surface of the spoon flush and free from catching-points, while the hook may be readily caused to protrude through when struck by a fish.

I have illustrated a modified construction which is very simple and effective in the longitudinal sectional view, Fig. 4, in which the spring D is soldered to the spoon A at or near the depressed seat $a$, and its free end projects downward, engaging the hook at the point $d'$. In this construction it will be observed that the ordinary hook, C, terminating in the ring $d$, may be employed, and the lug E is simply elongated and bifurcated, so as to provide bearings for the pin $e$, which passes through the lugs E and ring $d$ of the hook C, thereby pivoting the same to the spoon A.

The operation of my invention will be readily understood from the foregoing and from a consideration of the drawings.

It will be observed that the spring bearing at the extreme rear end or shank of the hook yields freely to pressure at the point of greatest curvature, where the hook is invariably struck when taken by a fish; hence the point is forced into the fish's mouth, so as to insure great efficiency in use.

The invention presents a most effective device for avoiding entanglement with grass, weeds, submerged logs, &c., and consequently is very durable in use.

Having thus fully described my invention, what I claim as new, and desire to secure by Letters Patent, is—

1. A trolling-spoon having a seat for the bill or point of the fish-hook and a slot at or near one end through which the hook may protrude when struck by a fish, substantially as and for the purpose set forth.

2. The combination, with a trolling-spoon provided with a slot at or near one end and a seat for the point or bill of the hook to rest against, of a spring-actuated hook secured to the reverse side of the spoon, substantially as and for the purpose set forth.

3. A trolling-spoon fish-hook comprising a spoon, and a fish-hook yieldingly attached to one side of the spoon, with the main part of its body exposed to the strike of the fish and its point seated against the opposite face of the spoon, so as to prevent the hook from catching or entangling with obstructions as it is drawn through the water, substantially as and for the purpose set forth.

4. A trolling-spoon provided with a slot at or near one end through which the hook may protrude, said hook being actuated by spring-power to throw the point of the hook toward the spoon, substantially as and for the purpose set forth.

5. An artificial bait provided with a spring-actuated hook, the force of said spring tending to throw the point of the hook toward the body of the bait, as and for the purpose set forth.

In testimony whereof I have hereunto signed my name, in the presence of two attesting witnesses, at Syracuse, in the county of Onondaga, in the State of New York, this 23d day of August, 1887.

JOHN R. HARLOW.

Witnesses:
FREDERICK H. GIBBS,
E. C. CANNON.